US005256336A

United States Patent [19]

Beamish et al.

[11] Patent Number: 5,256,336

[45] **Date of Patent: * Oct. 26, 1993**

[54] STABLE AQUEOUS DISPERSIONS OF FLUORESCENT BRIGHTENING AGENTS OF THE COUMARINE TYPE AND METHOD OF PREPARING SAME

[75] Inventors: Thomas B. Beamish, Holland, Mich.; Rainer Dyllick, Weinheim, Fed. Rep. of Germany

[73] Assignee: BASF Corporation, Parsippany, N.J.

[ * ] Notice: The portion of the term of this patent subsequent to Jun. 16, 2009 has been disclaimed.

[21] Appl. No.: 847,130

[22] Filed: Mar. 6, 1992

Related U.S. Application Data

[63] Continuation-in-part of Ser. No. 648,671, Jan. 31, 1991, Pat. No. 5,122,304.

[51] Int. Cl.[5] ........................ C11D 3/42; C09K 11/06

[52] U.S. Cl. ................................ 252/543; 252/301.21; 252/301.22; 252/301.32; 252/153; 252/173; 252/174.15

[58] Field of Search .................... 252/543, 301.21, 173, 252/174.23, 558, 301.22, 174.24, 153, 559, 162, DIG. 14, 174.15, 153

[56] References Cited

U.S. PATENT DOCUMENTS

| | | | |
|---|---|---|---|
| 3,832,310 | 8/1974 | Grand | 252/543 |
| 3,953,380 | 4/1976 | Sundby | 252/543 |
| 4,460,374 | 7/1984 | Abel et al. | 8/501 |
| 5,122,304 | 6/1992 | Beamish et al. | 252/543 |

*Primary Examiner*—Paul Lieberman
*Assistant Examiner*—Erin M. Higgins

[57] ABSTRACT

Novel aqueous dispersion comprising 7-diethylamino, 4-methyl coumarine or 7-dimethylamino, 4-methyl coumarine in combination with one or more suitable dispersants, humectants and defoamers are disclosed, as well as a method for preparing these.

2 Claims, No Drawings

STABLE AQUEOUS DISPERSIONS OF FLUORESCENT BRIGHTENING AGENTS OF THE COUMARINE TYPE AND METHOD OF PREPARING SAME

This is a continuation-in-part of copending application Ser. No. 07/648,671 filed on Jan. 31, 1991, now U.S. Pat. No. 5,122,304.

FIELD OF THE INVENTION

This invention relates to stable aqueous dispersions of fluorescent brightening agents of the coumarine type and to a method of preparing same. More particularly, the present invention relates to aqueous dispersions comprising 7-diethylamino, 4-methyl coumarine and also to aqueous dispersions comprising 7-dimethylamino, 4-methyl coumarine.

BACKGROUND OF THE INVENTION

Fluorescent brightening agents are used primarily to complement unwanted yellowish shades of textiles or paper by supplying complementary bluish light in the presence of UV radiation. An important market segment of the solvent soluble fluorescent brighteners is their application in textiles like noncellulosics. The application of solvent soluble fluorescent brighteners such as the coumarines is usually done via aqueous dispersions, thus most solvent soluble fluorescent brighteners are marketed as aqueous dispersions.

Numerous fluorescent brighteners have been formulated into aqueous dispersions and are described in the patent literature, for example U.S. Pat. Nos. 4,216,111, 4,369,040, 4,288,225 and 304,569. Many dispersions containing fluorescent brighteners which are commercially available today, especially in Europe, have at most about 10% by weight of the particular brightener utilized. Often, this is not optimal in terms of economics and efficiency. That is, there are considerably more costs associated with producing, shipping and storing relatively unconcentrated aqueous dispersions.

Aminocoumarines like 7-diethylamino, 4-methyl coumarine and 7-dimethylamino, 4-methyl coumarine, often referred to as Fluorescent Brighteners 61 and 130, respectively, are an interesting class of fluorescent brighteners for non-cellulosics. It is believed that these fluorescent brighteners have not been formulated into aqueous dispersions.

A great number of different dispersants have also been utilized with fluorescent brighteners in formulating aqueous dispersions. These dispersants include many anionic, nonionic and cationic polymers. In many instances, the exact formula of these polymers is not known because their exact constitutions are trade secrets. Thus, they are often referred to by their trademarks or trade names/manufacturers.

There presently exists a need for aqueous dispersions with aminocoumarine type fluorescent brighteners such as 7-diethylamino, 4-methyl coumarine and 7-dimethylamino, 4-methyl coumarine in combination with suitable dispersants. There also exists a need for aqueous dispersions which can be made relatively more concentrated in terms of the particular fluorescent brightener utilized.

OBJECTS OF THE INVENTION

It is therefore an object of the present invention to provide improved stable aqueous dispersions suitable for use as detergent brighteners, as well as for treating textile and paper products, for making fluorescent pigments, and for coating coverage verification.

Another object of the invention is to provide aqueous dispersions which can be relatively more concentrated than those currently available in the art.

It is a further object of the present invention to provide aqueous dispersions comprising 7-diethylamino, 4-methyl coumarine, as well as dispersions comprising 7-dimethylamino, 4-methyl coumarine.

It is also an object of the invention to provide aqueous dispersions comprising the aforementioned coumarine-type fluorescent brighteners in combination with suitable dispersants.

Another object of the present invention is to provide a method of preparing aqueous dispersions which have the aforesaid coumarine brighteners.

A further object of the invention is to provide aqueous dispersions with coumarine-type fluorescent brighteners which have improved solubility/dilutability characteristics in detergent solutions when compared with powdered fluorescent brighteners.

Still another object of the invention is to provide an improved liquid detergent suitable for home or commercial use, wherein the improvement comprises the novel aqueous dispersion set forth herein as part of standard detergent formulations.

SUMMARY OF THE INVENTION

These and other objects of the invention are achieved by providing a relatively concentrated, storage-stable heat and frost resistant, e.g. stable from about −25° C. to about 50° C., aqueous dispersion comprising from about 5 to about 50% by weight of 7-diethylamino, 4-methyl coumarine and from about 0.1 to about 25% solids by weight of one or more suitable water-soluble dispersants selected from the group of anionic, cationic and nonionic surfactants. Preferably, the aforesaid coumarine is obtained from BASF Corporation under the trademark CALCOFLUOR® WHITE RWP CONC. Preferably, the dispersant is an anionic polyelectrolyte, sulfonated polystyrene. A particularly suitable dispersant is sodium polystyrene sulfonate. Most preferred is the sodium polystyrene sulfonate marketed under the trademark VERSA TL® 77 from National Starch and Chemical Corp. as a 30% solids solution by weight.

In another embodiment of the invention, an aqueous dispersion is provided comprising from about 5 to about 50% by weight of 7-dimethylamino, 4-methyl coumarine and one or more suitable dispersants in an amount ranging from about 0.1 to about 25% solids by weight. Preferably, the coumarine is one available under the trademark CALCOFLUOR® WHITE LD, also marketed by BASF Corp. The dispersant is preferably one or more styrene/acrylic acid copolymers. Particularly suitable is the mixture of styrene/acrylic acid sold under the trademark JONCRYL® 62 and available from Johnson Wax Corp.

Defoamers may also be employed in the aqueous dispersions as part of the invention is amounts ranging from about 0 to about 3% by weight. Preferred defoamers for use with the aqueous dispersion comprising 7-diethylamino, 4-methyl coumarine are water-based silicone emulsions. Especially preferred is a silicone emulsion marketed by Dow under the trademark DOW CORNING® 65 ADDITIVE. Preferred defoamers for use with the aqueous dispersion comprising 7-dimethylamino, 4-methyl coumarine are mixtures of 2,5,8,11-tetramethyl-6-dodecyn-5,8-diol, dipropylene glycol and ethylene glycol. Particularly preferred is SURFONYL ® DF-110L, available from Air Products and Chemicals, Inc., which contains a mixture of the aforementioned compounds.

The aqueous dispersions may further comprise at least one humectant in an amount of from about 0 to about 30% by weight, as well as at least one fungicide in an amount of up to about 0.1% by weight. The remaining part of the aqueous dispersions is water in an amount of from 20 to about 94.9%. (Unless otherwise specified, all percentages set forth herein are expressed in terms of weight based on the total weight of the aqueous dispersion).

The method for preparing the novel aqueous dispersions involves mixing the aforesaid components, and milling in a sand mill or other suitable dispersion equipment to a particle size below about 10 microns.

Also included as part of the invention is an improvement for liquid detergent compositions wherein the improvement comprises the novel aqueous dispersions set forth herein.

DETAILED DESCRIPTION OF THE PREFERRED EMBODIMENTS

The fluorescent brightener 7-diethylamino, 4-methyl coumarine has the following chemical $C_{14}H_{17}NO_2$, and the structural formula below:

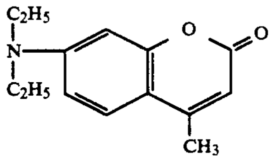

A preferred coumarine as part of the aqueous dispersion and having the above formula is marketed under the trademark CALCOFLUOR ® WHITE RWP CONC. and supplied by BASF Corporation. The Color Index name for 7-diethylamino, 4-methyl coumarine is Fluorescent Brightener 61.

7-dimethylamino, 4-methyl coumarine has the following chemical formula: $C_{12}H_{13}NO_2$, and structural formula:

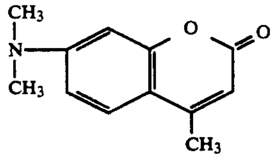

A preferred coumarine having this structure is sold under the trademark CALCOFLUOR ® WHITE LD, also a product of BASF Corporation. Its Color Index name is Fluorescent Brightener 130.

The foregoing aminocoumarine fluorescent brighteners are present in the aqueous dispersions in an amount ranging from greater than or equal to about 5 to about 50% by weight, preferably from greater than or equal to about 10 to about 50% by weight and more preferably, from about 25 to about 45% by weight, most preferably, from about 25 to about 30% by weight. Presently, many dispersions commercially available contain only up to about 10% of other fluorescent brighteners. It has now been discovered that stable dispersions with up to about 50% of the aminocoumarine type brighteners heretofore described can be produced. Thus, the aqueous dispersions of the present invention can be described as 15 being relatively more concentrated than many currently available in the art.

Preferably, the coumarines in the aqueous dispersions will have a mean particle size of less than about 5 microns, and most preferably less than about 1 micron. It is desirable that the coumarines do not sediment in the aqueous dispersions, even upon prolonged storage. The coumarines are insoluble or only sparingly soluble in water.

In one preferred embodiment of the present invention, the aqueous dispersion comprises 7-diethylamino, 4-methyl coumarine and an anionic polyelectrolyte, sulfonated polystyrene dispersant, most preferably sodium polystyrene sulfonate. A particularly suitable sodium polystyrene sulfonate is manufactured by National Starch and Chemical Corp. and sold under the trademark VERSA ® TL 77, which is a 30% solids by weight solution. This dispersant has the following structural formula:

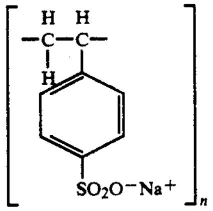

In another preferred embodiment of the invention, the aqueous dispersions comprises 7-dimethylamino, 4-methyl coumarine and one or more styrene/acrylic acid copolymers as the dispersant. Especially preferred is a mixture of styrene/acrylic acid copolymers sold under the trademark JONCRYL ® 62. This dispersant is an aqueous 30% solids acrylic resin solution and is marketed by Johnson Wax Corporation.

It is especially desirable that the dispersants be present in the aqueous dispersions according to the invention in an amount ranging from about 3% to about 25% by weight of solids. Those skilled in the art may discover that one or more other water-soluble dispersants of the classes of anionic, cationic and nonionic surfactants which are commercially available will prove efficacious in formulating the aqueous dispersions with the coumarines heretofore described.

In order to protect the dispersions from excess drying, humectants may be added as part of the aqueous dispersions. The humectants are preferably high boiling alcohols, di- and triols. Examples of suitable humectants include propylene glycol, dipropylene glycol, glycerol, pentaerythritol and sorbitol, but any other hygroscopic compounds may also be used. Those skilled in the art will recognize that these humectants will have a positive effect on the flow properties of the aqueous dispersions, but may solubilize the coumarines at elevated temperatures, thereby possibly leading to undesirable crystal growth (often referred to as Ostwald ripening).

Defoamers may also be employed in the aqueous dispersions as part of the invention. Defoamers are utilized in many applications, e.g. in aqueous dispersions, where their anti-foaming, foaming, defoaming, and dearientrainment properties are desirable. Preferred defoamers for use with the aqueous dispersions comprising 7-diethylamino, 4-methyl coumarine are water-based silicone emulsions. Especially preferred is the water-based silicone emulsion marketed by Dow under the trademark DOW CORNING® 65 ADDITIVE. An especially preferred defoamer for use with the aqueous dispersion comprising 7-dimethylamino, 4-methyl coumarine is a clear yellow liquid solution known as SURFYNOL® DF-110L, a product of Air Products and Chemicals, Inc. SURFYNOL® DF-110L is a mixture of 2,5,8,11-tetramethyl-6-dodecyn-5,8-diol, dipropylene glycol and ethylene glycol. Those skilled in the art may discover that other defoamers may be desirable as part of the aqueous dispersions according to the various embodiments of the present invention, either alone or in combination with one another, or in combination with the defoamers heretofore set forth.

One or more fungicide additives may also be included as part of the aqueous dispersions set forth herein in preferred total amounts of up to about 0.1% by weight. Fungicides inhibit bacterial growth and thereby add to the storage life of the aqueous dispersions. There are several fungicides currently available in the art which may be utilized in conjunction with the aqueous dispersions as part of the invention. Examples of suitable fungicides include aqueous dispersions of 1,2-dibromo-2,4-dicyanobutane and 1-(3-chlorallyl)-3,5,7-triaza-1-azoniaadamantane chloride.

Other additives can include other types of preservatives or biocides, as well as pH regulators and buffers. Examples of pH regulators include n,n-dimethylethanolamine (DMEA) and 2-amino-2-methyl-1-propanol (AMP), while examples of pH buffers include sodium borate and sodium carbonate. It is preferred that the total weight of any of the aforesaid additives plus any defoamers not exceed about 5% of the total weight of the aqueous dispersions.

The remaining portion of the aqueous dispersions according to the various embodiments of the invention comprise water in an amount ranging from about 20 to about 94.9% by weight.

One particularly preferred embodiment of the invention comprises about 30% by weight of 7-diethylamino, 4-methyl coumarine sold under the trademark CALCOFLUOR® WHITE RWP CONC., about 13.8% by weight (based on solids) of the dispersant VERSA TL® 77, about 1% of dipropylene glycol, about 0.1% of the defoamer DOW® 65, and about 55.1% of water. In another especially preferred embodiment of the present invention, the aqueous dispersion comprises about 25% by weight of 7-dimethylamino, 4-methyl coumarine marketed under the trademark CALCOFLUOR® WHITE LD, as well as about 18.7% (by weight of solids) of the dispersant JONCRYL®62, about 0% of humectant, about 0.1% of the defoamer SURFYNOL® DF-110L, and about 56.2% water.

In other embodiments of the invention the aqueous dispersions may also comprise from greater than or equal to from about 5 to about 25% by weight of 7-diethylamino, 4-methyl coumarine or 7-dimethylamino, 4-methyl coumarine. Within this range, the particular coumarine may also comprise from greater than or equal to from about 10 to about 25%, or even from about 15% to about 25%, as well as from about 20% to about 25% by weight of the aqueous dispersion. In these embodiments, the aqueous dispersions will also comprise from about 0.1 of to about 25% of dispersant, more preferably from about 3 to about 25%; as well as from about 0 to about 30% of humectant, more preferably from about 0 to about 2%; from about 0 to about 3% of defoamer, more preferably from about 0.1 to about 1%; and from about 20 to about 90% of water.

To obtain the aqueous dispersions according to the various embodiments of the invention, the coumarine, dispersant, humectant, if any, and defoamer and fungicide, if any, and water are comminuted in a stirred horizontal or vertical ball mill, for example. The grinding media may be glass, porcelain, ceramic, zirconium oxide, metal, sand or any other substance well known in the art. Preferably, the media employed are beads of approximately 1 millimeter diameter. The preferred particle sizes heretofore described for the coumarines are advantageously achieved during the mixing process.

The aqueous dispersions set forth herein are most preferably flowable, that is, pourable at room temperature (25.C). Depending upon the particular constituents and their quantities within the ranges heretofore set forth, the aqueous dispersions according to the invention may also be prepared to be thixotropic or even paste-like, depending on end customer preference. Thus, those skilled in the art will discover that the optimal degree of fluidity may depend upon individual user requirements as well.

The aqueous dispersions according to the present invention will find quick application in many different types of liquid detergents for use with textiles such as non-cellulosics. The fluorescent brighteners heretofore described have shown excellent substantivity for acetate, triacetate and nylon, as well as for wool and silk. Other applications for the aqueous dispersions include their use in making fluorescent pigments, for brightening facsimile paper and for coating coverage verification. Other applications may become evident to those skilled in the art, and are certainly within the scope of the invention.

The following examples illustrate the invention, and in no way should be construed as limiting the scope thereof:

EXAMPLE 1

Preparation (Parts and Percentages are by Weight)

30 parts of 7-diethylamino, 4-methyl coumarine (CALCOFLUOR White RWP conc. =Fluorescent Brightener 61, product of BASF Corp.), 46 parts VERSA® TL®77, containing 30% by weight solids of polystyrene sulfonate sodium salt in water, 1 part dipropylene glycol and approximately 0.1 part of defoamer DOW 65 and 23 parts of water were milled in a Dyno mill (Bachofen & Meier) using 1 mm glass beads. After three passes through the mill, a white homogeneous dispersion was obtained with the following properties:

Centrifuge Test at 2500 rpm for 2 hours:

<5% clear fluid, >95% soft solids with virtually no hard solids on the bottom of the test tube.

Microscopic inspection (1000×):

ca. 90% particles <5 microns ca. 10% particles 5–10 microns.

Particle size analysis (Brookhaven Instruments Corp. BI-DCP):

number average 0.35 micron weight average 0.55 micron pH at 25.C:5.95

Flow Properties at 25° C./Ford 4 cup 36 sec.

Solids Content (65° C., 4h under vacuum): 43.8%.

Freeze/Thaw Stability:

stable after 3 cycles of −25° C. then warming to 23° C.

Heat Stability:

stable to 50° C., at higher temperatures separation occurs.

EXAMPLE 2

Preparation 25 parts by weight of 7-dimethylamino, 4-methyl coumarine (CALCOFLUOR WHITE LD=Fluorescent Brightener 130, product of BASF Corp.), 62.5 parts JONCRYL® R 62 (30% solids content, styrene/acrylic acid copolymer, products of Johnson Wax Corp.) and small amounts of defoamer DF-110L (product of Air Products and Chemicals Inc.), and 12.5 parts water were milled in a Dyno mill (Bachofen & Meier) using 1 mm glass beads. After two passes a slightly greenish, homogenous dispersion was obtained with the following properties.

Centrifuge Test at 2500 rpm for 2 h: <5% clear fluid, >95% soft solids with virtually no hard solids on the bottom of the test tube.

Microscopic Inspection (1000×):

ca. 80% particles <5 microns, ca. 20% particles 5–20 microns.

Particle size analysis (Brookhaven Instrument Corp. BI-DCP):

number average 0.49 micron weight average 0.72 micron pH at 25° C.: 8.56.

Flow properties at 25° C./Zahn 5 cup: 120 seconds.

Solids Content (65° C., 4h under vacuum): 43.7%.

Freeze Thaw Stability:

stable after 3 cycles of −25° C. then warming to 23° C.

Heat Stability:

stable to 50° C., at higher temperatures separation occurs.

The aqueous dispersion according to the invention also possess improved solubility/dilutability characteristics in commercial liquid fabric preparations as compared with their fluorescent brightener counterparts in the form of powders. To demonstrate this, the following procedure was performed:

EXAMPLE 3

To 50.00 g of liquid detergent in a beaker was added 0.1% by weight of brightener of one of the following:

A) CALCOFLUOR White RWP Conc. Dispersion (0.17 g)

B) CALCOFLUOR White LD Dispersion (0.20 g)

C) CALCOFLUOR White RWP Powder (0.05g)

D) CALCOFLUOR White LD Powder (0.05 g)

Each of the above mixtures was then stirred on a magnetic stir plate. The time required to attain a clear, non-turbid solution was then measured and recorded. The results are set forth below:

A) less than 5 minutes

B) less than 5 minutes

C) 45 minutes

D) 60 minutes

While the invention has been described in each of its various embodiments, it is to be understood that changes or modifications in scope or detail may occur to those skilled in the art without departing from the true spirit and scope of the invention as set forth herein.

What is claimed is:

1. A storage-stable heat and frost resistant aqueous dispersion, comprising:

a range of from greater than about 10 up to about 25% by weight of a fluorescent brightener selected from the group consisting of 7-diethylamino, 4-methyl coumarine and 7- dimethylamino, 4-methyl coumarine;

from about 0.1 to about 25% by weight of at least one water soluble dispersant selected from the group consisting of anionic, cationic and nonionic surfactants;

from about 0 to about 30% by weight of at least one humectant selected from the group consisting of propylene glycol, glycerol, pentaerythritol and sorbitol;

from about 0 to about 3% by weight of one or more defoamers selected from the group consisting of silicone emulsions and a mixture of 2,5,8,11-tetramethyl-6-dodecyn-5,8-diol, dipropylene glycol and ethylene glycol; and from about 20% to about 90% by weight of water.

2. An aqueous dispersion as claimed in claim 1, wherein said fluorescent brightener is present in said aqueous dispersion in an amount of about 20% by weight.

* * * * *